United States Patent [19]

Shanklin et al.

[11] Patent Number: 4,581,508
[45] Date of Patent: Apr. 8, 1986

[54] HORN BUTTON CONTACT ASSEMBLY

[75] Inventors: Donald J. Shanklin, Fullerton; Robert Hester, Simi Valley, both of Calif.

[73] Assignee: Superior Industries International, Inc., Van Nuys, Calif.

[21] Appl. No.: 669,003

[22] Filed: Nov. 7, 1984

[51] Int. Cl.[4] .............................................. H01H 9/00
[52] U.S. Cl. ................................ 200/61.54; 200/61.55
[58] Field of Search ............... 200/61.54, 61.55, 61.56, 200/61.57

[56] References Cited

U.S. PATENT DOCUMENTS

| | | | |
|---|---|---|---|
| 1,550,958 | 8/1925 | Guyman | 200/61.55 |
| 1,801,551 | 4/1931 | Geyer | 200/61.55 |
| 1,828,403 | 10/1931 | Geyer | 74/552 |
| 1,967,030 | 7/1934 | Kull | 200/159 R |
| 1,983,095 | 12/1934 | Parker | 200/61.55 |
| 2,119,752 | 6/1938 | Pulleyblank | 200/61.55 |
| 2,133,472 | 10/1938 | Parker | 200/61.55 |
| 2,221,409 | 11/1940 | Phelps et al. | 200/61.55 |
| 2,625,618 | 1/1953 | Creson | 200/61.55 |
| 2,631,208 | 3/1953 | Kibiger | 200/61.55 |
| 2,708,695 | 5/1955 | Gibbs | 200/61.55 |

*Primary Examiner*—J. R. Scott
*Assistant Examiner*—Morris Ginsburg
*Attorney, Agent, or Firm*—Fulwider, Patton, Rieber, Lee & Utecht

[57] ABSTRACT

An improved horn button contact assembly formed with downwardly-protruding tabs is held by an electrically non-conducting and resilient spider such that the downwardly protruding tabs make contact with the steering wheel, which acts as the circuit ground, and closes the circuit, thereby activating the horn.

14 Claims, 6 Drawing Figures

HORN BUTTON CONTACT ASSEMBLY

FIELD OF THE INVENTION

The present invention relates to electromechanical devices for sounding vehicle horns.

DESCRIPTION OF THE PRIOR ART

Various horn activating systems have been heretofore proposed providing for the closure of an electrical circuit upon depression of a vehicle horn button. Examples are disclosed in Kibiger, U.S. Pat. No. 2,631,204; Creson, U.S. Pat. No. 2,625,618; and Parker, U.S. Pat. No. 2,133,472. A typical prior art system, utilizes contact plates in close proximity which tend to malfunction due to electrical arcing between the plates, particularly after prolonged use.

Other typical prior art devices use one or more bushings to make electrical contact when the horn button is depressed. Such arrangements are failure-prone. In addition, such arrangement increase the cost of the horn assembly. In general, prior art systems are overly complex in structure, contain many parts, are expensive to manufacture, and suffer from reliability problems.

SUMMARY OF THE INVENTION

A primary object of the present invention is to provide an improved horn button contact assembly utilizing a minimum number of parts, thus increasing reliability and ease of manufacture and assembly, as well as reducing manufacturing costs.

It is a further object of the present invention to provide a horn button contact assembly which will minimize arcing, since such arcing corrodes the contact surface, reducing the conductivity thereof.

An additional object of the present invention is to provide a horn button contact assembly of the aforedescribed nature wherein the parts thereof are placed sufficiently close together that a relatively small amount of displacement is required when the horn button is pushed downward, yet such horn button will readily spring back and open the ciruit when the horn button is released.

Yet a further object of the present invention is to provide a horn button contact assembly which may be substituted for or retrofitted to existing horn button contact assemblies installed on existing automobile steering wheels and steering shafts.

The horn button contact assembly of the present invention provides the aforementioned objects and advantages by utilizing the center area of the spokes in the steering wheel as part of the circuit ground. The contact member which closes the horn circuit to ground is a conducting wire with downwardly-protruding contact tabs. When the operator depresses the horn button, causing the downwardly-protruding tabs of the wire to be pressed against the steering wheel, the circuit closes to ground. The conducting wire is secured to, and insulated by, a non-conducting spider, having resilient arms extending radially outward from a center opening. The tabs protrude from the underside of the spider in a position to contact the center area of spokes in the steering wheel and close the circuit to ground.

When the horn button is released, the resilient radial arms of the spider return the tabs to their original positions and the horn circuit is opened.

Other objects and features of the invention will become apparent from consideration of the following description taken in connection with the accompanying drawings.

DESCRIPTION OF A PREFERRED EMBODIMENT

Figure 1:
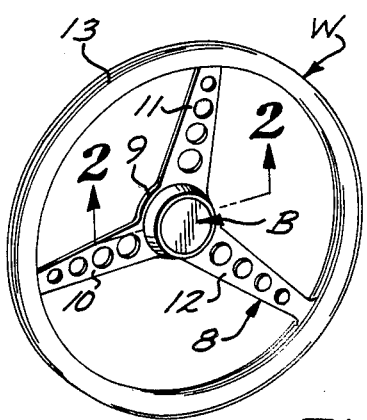
FIG. 1 is a reduced front perspective view of a steering wheel provided with a horn button contact assembly embodying the present invention.

Referring to the drawings and particularly FIG. 1 thereof, there is shown a steering wheel W with a horn button B coaxially positioned over the center thereof. Steering wheel W includes a spoke member, generally designated 8, formed of an electrically-conducting material such as stainless steel or chrome-plated steel. Spoke member 8 has an annular center from which extend three integral spokes 10, 11 and 12. The spokes are upwardly inclined from center 9 to rim 13 with the free ends of the spokes affixed to a conventional rim 13.

Figure 2:
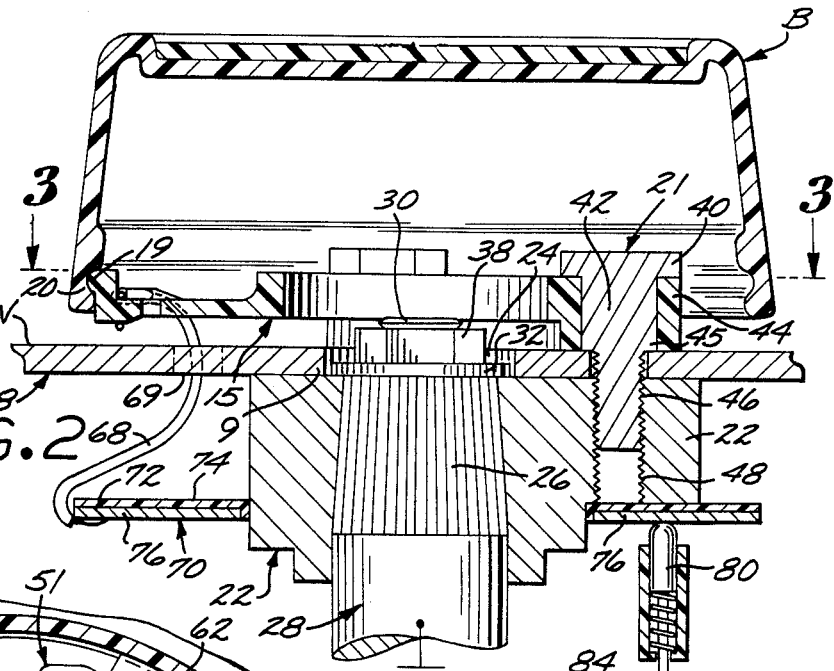
FIG. 2 is a transverse cross-sectional view in enlarged scale along line 2—2 of FIG. 1.
Figure 3:
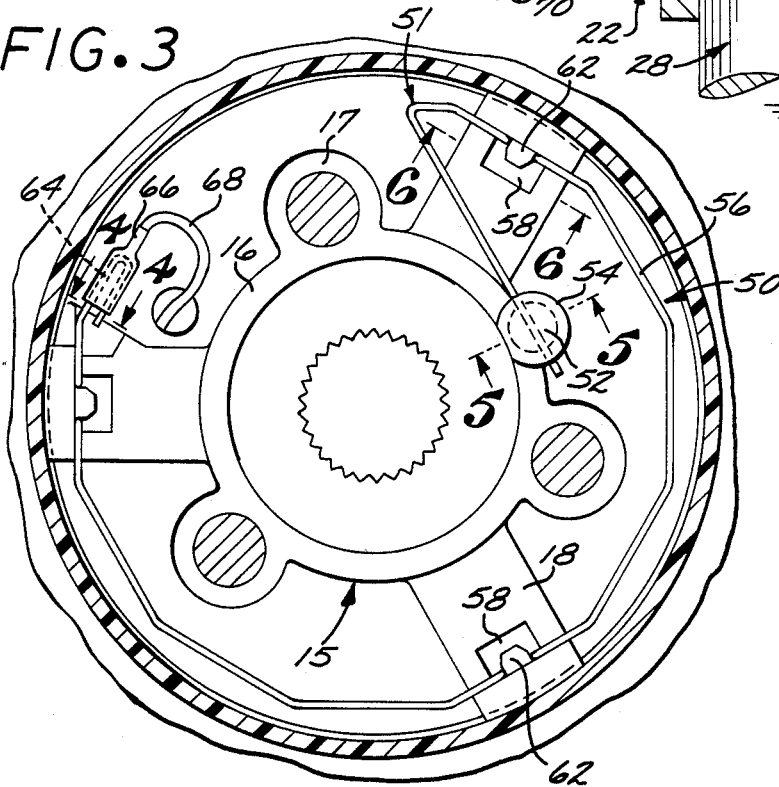
FIG. 3 is a horizontal sectional view taken along line 3—3 of FIG. 2.

More particularly, and referring to FIGS. 2, and 3, there is shown the relative spacial positions of the steering wheel W, and the horn button B. A spider member, generally designated 15, is coaxially interposed between the steering wheel and the horn button. Spider 15 is integrally formed of a non-conducting synthetic plastic material having a memory. The spider includes a center ring 16 integrally formed with three like, equidistantly-spaced, arcuate extensions 17 and three like equidistantly-spaced, radial-extending arms 18, as seen in FIG. 2. Arms 18 are resilient and formed at their free ends with protrusions 19 to provide a snap-in, friction-fit with complementary indentations 20 in the horn button B to secure spider 15 to the side walls of the horn button B, as best seen in FIG. 2. Spider 15 is affixed to the steering wheel W by three equidistantly-spaced shoulder bolts 21 (only one of which is shown) that are threaded into a hub member 22 disposed below the steering wheel, such bolts also securing the center 9 of the steering wheel to the hub member. The heads 40 of bolts 21 rest upon the outer surface of spider 15 with the main shank 42 of the bolts passing through annular spacers 44 of the spider extensions 17. The bolt shoulders 45 engage the upper surface of steering wheel center 9. The threaded shank 46 of each of the bolts mate with threaded bores 48 of the hub 22.

Figures 5, 6:
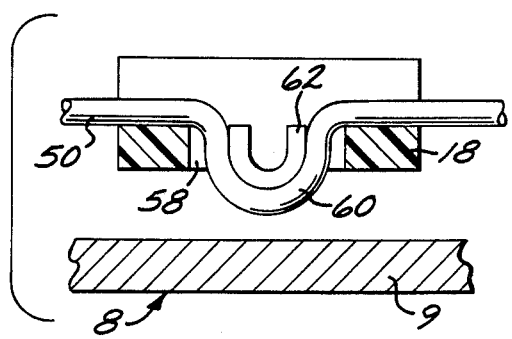
FIG. 5 is a broken sectional view taken in further enlarged scale along line 5—5 of FIG. 3.
FIG. 6 is a broken sectional view taken in further enlarged scale along line 6—6 of FIG. 3.

A conducting wire 50 has one end 51 attached to center ring 16 of spider 15 by wedging such wire into a groove 52 formed in an anchor element 54 integral with the spider center ring 16, as shown in FIG. 5. From anchor element 54, wire 50 extends outwardly to define a multi-angular arcuate segment 56 of a circle that is anchored at spaced points to the radially outer part of the three arms 18 of the spider 15 by being wedged into recesses 58 formed in the spider arms. Thus, as shown in FIG. 6, the conducting wire 50 is bent into curved contact tabs 60 which extend through recesses 58 to the underside of arms 18 and are retained in this position by integral U-shaped anchoring strips 62 formed on the arms.

Figure 4:
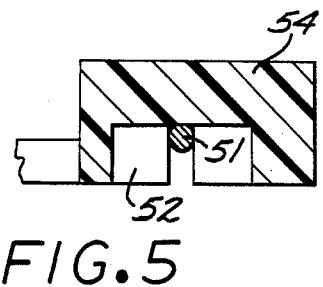
FIG. 4 is a broken sectional view taken in further enlarged scale along line 4—4 of FIG. 3.

The end 64 of conducting wire 50 opposite end 51 is removably received by a conventional connector 66 that is attached to an insulated wire 68 which extends through an opening 69 formed in spoke member 8, as shown in FIGS. 2, 3 and 4.

With continued reference to FIG. 2, an annular base plate 70 is rigidly secured as by bonding to the lower portion of hub 22. It should be noted that hub 22 is formed of a metallic material and includes a splined center opening 24 to receive the complementary splined end portion 26 of a conventional steering column 28 of a vehicle. The outer end of steering column 28 is formed with a threaded post 30 that coaxially extends through hub center opening 24 so as to receive a washer 32 and nut 38, as seen in FIG. 2. The nut and washer removably secure steering wheel W to the steering column 28. Steering column 28 will be seen to be in electrical contact with the spokes 8 of the steering wheel.

The upwardly-facing side 72, an inner periphery of base plate 70, is comprised of an electrically insulating material 74, while the lower portion 76 of the base plate is comprised of a conducting material, which in a preferred embodiment is copper beryllium used to minimize electrical arcing to the plate. It should be appreciated that the insulating material of upwardly-facing side 72 between the conducting downwardly-facing portion 76 and spokes 8 of the steering wheel W further eliminates arcing by providing an insulated buffer between the conducting lower base plate portion 72 and the steering wheel. As shown in FIG. 2, the end of insulated wire 68 opposite connector 66 is electrically connected to lower base plate portion 76.

In most automotive vehicles, the steering column 28 is connected to electrical ground through connection with the vehicle chassis, which in turn is connected to the negative side of the vehicle battery. In some vehicles, a spring-loaded pin 80 is available within the vehicle for connection to the negative side 81 of the horn 82, as shown in FIG. 2. The spring-loaded pin makes contact at its upper end with the conducting underside of base plate portion 76, which in turn is connected by insulated wire 83 to the negative side 81 of the vehicle horn 82, as shown in FIG. 2. In another preferred embodiment applicable to certain vehicle designs, the spring-loaded pin makes direct contact with the end 51 of conducting wire 50 through the opening of anchor element 54.

If a spring-loaded pin is not available, the downwardly-facing side of the base plate may be otherwise connected to the negative side of the horn, as with a conventional soldered-wire connection. The positive side of the horn 82 is connected to the existing vehicle battery 84. The negative side of battery is grounded when the horn is sounding and open when the horn is silent.

With continued reference to FIG. 2 and FIG. 6, when downward force is applied to the horn button B and hence to spider 15, the spider arms bend downwardly whereby the downwardly-protruding contact tabs 60 of the conducting wire 50 make contact with the steering wheel center 9, closing the horn to ground through the spring-loaded pin 80 to thereby actuate the horn. When the horn button is released, the resiliency of the spider arms 18 will cause such arms to flex upwardly to their original position and the downwardly-protruding contact tabs of the conducting wire will resume their non-contact making position above the steering wheel whereby the horn circuit returns to an open condition. It should be noted that only a relatively small amount displacement of spider 15 is required to actuate the horn upon the application of downward axial force on the horn button B since contact tabs 60 are in close proximity to the steering wheel center.

Various modifications and changes may be made with regard to the foregoing detailed description without departing from the spirit of the invention.

I claim:

1. A horn button contact assembly for use with a horn, in combination with a steering wheel having an electrically-conducting center and a grounded steering wheel column, said combination comprising:
    a conducting wire formed with downwardly protruding contact tabs;
    an electrically non-conducting spider member having a center ring from which extend resilient arms that carry said conducting wire with its contact tabs spaced above the center of said steering wheel;
    a horn button attached to said arms;
    a hub secured to the steering wheel column;
    fastener means connecting said spider member and the steering wheel center to said hub;
    electrical conducting means for connecting said conducting wire to a negative side of the horn; and
    with the application of downward force upon said horn button causing said contact tabs to engage the center of the steering wheel for activating the horn.

2. The combination as set forth in claim 1 wherein said spider member is formed of a synthetic plastic material having a memory and said center ring is integrally formed with a plurality of arcuate extensions that receive said fastener means, with said arms extending radially from said center ring.

3. The combination as set forth in claim 1 wherein said spider member is coaxial with the steering wheel and the steering column.

4. The combination as set forth in claim 1 wherein said conducting wire extends from the center ring of said spider member through recesses formed in radially outer portions of the spider arms.

5. The combination as set forth in claim 1 wherein said electrical conducting means includes a base plate having an electrically conducting portion and a means for connecting said electrically conducting portion of said base plate to said conducting wire.

6. The combination as set forth in claim 5 wherein said means for connecting said electrically conducting portion of said base plate to said conducting wire comprises an insulated wire.

7. The combination as set forth in claim 2 wherein said spider member is coaxial with the steering wheel and the steering column.

8. The combination as set forth in claim 2 wherein said fastener means are shoulder bolts having heads resting upon the spider member, shoulders extending through said arcuate extensions and shanks that are threaded into said hub.

9. The combination as set forth in claim 5 wherein said spider member is formed of a synthetic plastic material having a memory and said center ring is integrally formed with a plurality of arcuate extensions that receive said fastener means, with said arms extending radially from said center ring.

10. The combination as set forth in claim 5 wherein said conducting wire extends from the center ring of said spider member through recesses formed in the spider arms.

11. The combination as set forth in claim 6 wherein said spider member is formed of a synthetic plastic material having a memory and includes said center ring integrally formed with a plurality of arcuate extensions that receive said fastener means, with said arms extending radially from said center ring.

12. The combination as set forth in claim 6 wherein said spider member is coaxial with the steering wheel and the steering column.

13. The combination as set forth in claim 6 wherein said conducting wire extends from the center ring of said spider member through recesses formed in the resilient arms of the spider member.

14. A horn button contact assembly for use with a vehicle having a horn in combination with a steering wheel, a grounded steering wheel column, and a spring-biased pin, said combination comprising:

a conducting wire formed with downwardly protruding contact tabs;

an electrically non-conducting spider member coaxial with the center of said steering wheel and having a center ring from which extend resilient arms that carry said conducting wire with its contact tabs spaced above the center of said steering wheel;

a horn button attached to said arms;

a hub secured to the steering wheel column;

fastener means connecting said spider member and the center of said steering wheel to said hub;

a base plate having an electrically-conducting portion in contact with said spring-biased pin;

means for connecting said electrically-conducting portion of said base plate to said conducting wire; and with the application of downward force upon said horn button causing said contact tabs to engage the center of the steering wheel for activating the horn.

* * * * *